(12) United States Patent
Kim

(10) Patent No.: US 8,281,164 B2
(45) Date of Patent: Oct. 2, 2012

(54) METHOD AND APPARATUS FOR OPTIMIZING CLOCK SPEED AND POWER DISSIPATION IN MULTICORE ARCHITECTURES

(75) Inventor: Nam Sung Kim, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 234 days.

(21) Appl. No.: 12/857,167

(22) Filed: Aug. 16, 2010

(65) Prior Publication Data
US 2012/0042176 A1    Feb. 16, 2012

(51) Int. Cl.
G06F 1/00       (2006.01)
(52) U.S. Cl. .................................. 713/300; 713/320
(58) Field of Classification Search .......... 713/300–320, 713/322–340
See application file for complete search history.

(56) References Cited

U.S. PATENT DOCUMENTS
8,140,876 B2 *  3/2012  Arnold et al. ................ 713/320

OTHER PUBLICATIONS

Tschanz, James W., et al., Effectiveness of Adaptive Supply Voltage and Body Bias for Reducing Impact of Parameter Variations in Low Power and High Performance Microprocessors, pp. 826-829, vol. 38, No. 5, May 2003, IEEE Journal of Solid-State Circuits, New York, New York, USA.

Tschanz, James W., et al., Adaptive Body Bias for Reducing Impacts of Dei-to-Die and Within-Die Parameter Variations on Microprocessor Frequency and Leakage, ISSCC 2002/Session 25, Processor Building Blocks, 25.7, Feb. 6, 2002, Salon 9, 4:45 p.m., 2002 IEEE International Solid-State Circuits Conference, IEEE, New York, New York, USA.

* cited by examiner

Primary Examiner — Clifford Knoll
(74) Attorney, Agent, or Firm — Boyle Fredrickson, S.C.

(57) ABSTRACT

A multicore processor provides for local power control at each of the cores which is used to lower the maximum operating frequency of cores by any amount above of the maximum operating frequency of the slowest core. This power savings is then used to increase the maximum operating frequency of the frequency balanced cores within a power constraint.

19 Claims, 3 Drawing Sheets

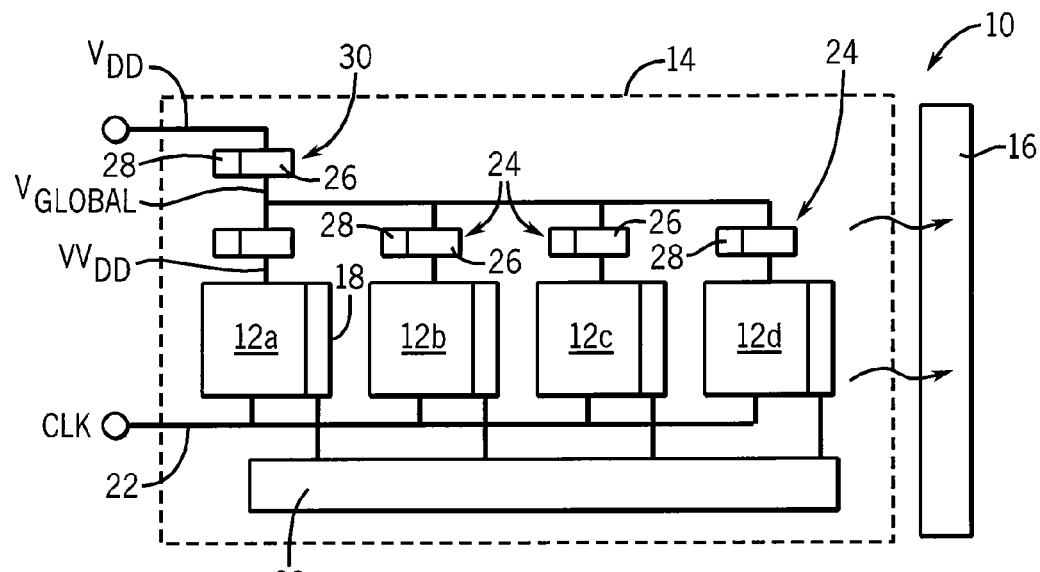
FIG. 1
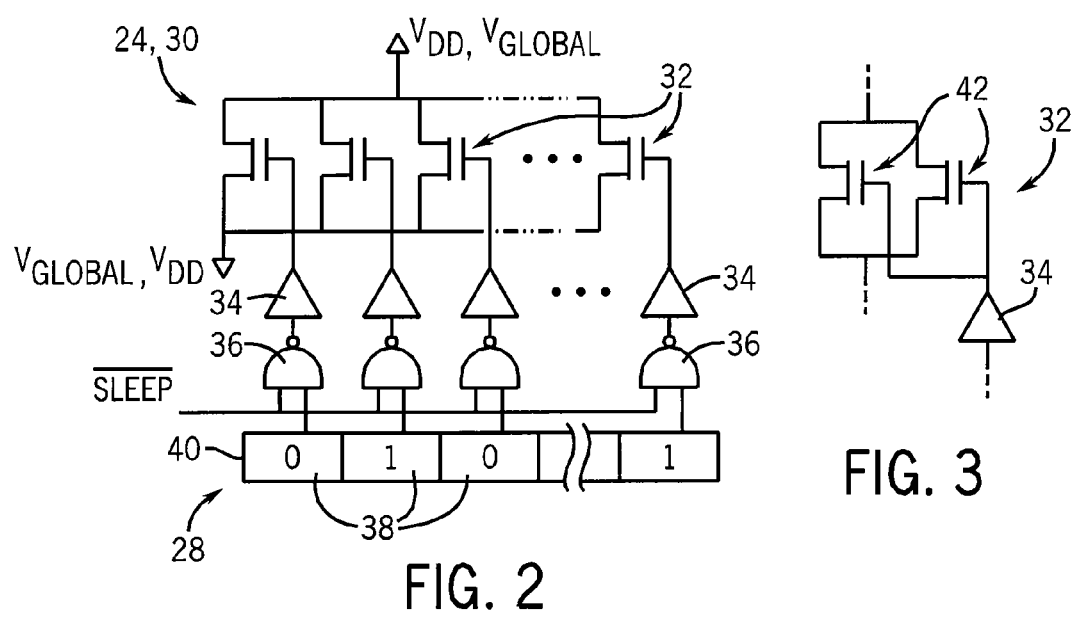
FIG. 2
FIG. 3

METHOD AND APPARATUS FOR OPTIMIZING CLOCK SPEED AND POWER DISSIPATION IN MULTICORE ARCHITECTURES

BACKGROUND OF THE INVENTION

The present invention relates to architectures for multicore processor systems and in particular to a multicore processor and method of manufacturing the same providing improved performance.

Multicore processors incorporate one or more independent cores or processing elements onto an integrated circuit or substrate in order to provide for effectively faster processing by distribution of portions of the parallel processing task among different cores. A multicore processor generally provides for a shared memory, or the equivalent, implemented through message passing to provide close coupling between the different processors. As a result, the clocks of the different processes are generally synchronized and/or of equal frequency.

As integrated circuit technology scales below 65 nm, the cores of multicore processors exhibit a spread in device delay and leakage power across cores. This results in significant variations in maximum operating frequency ($F_{MAX}$) and in total power dissipation ($P_{TOT}$). Normally, all cores of a multicore processor are operated at or below the maximum operating frequency of the slowest core so that the clocks may be equal and synchronized.

A trade-off between maximum operating frequency and total power dissipation may be made by changing the voltage applied to the cores. In this way, excessive power dissipation by a multicore processor may be reduced by reducing the operating voltage of the cores with a corresponding reduction in maximum operating frequency.

SUMMARY OF THE INVENTION

The present invention provides an improved method of separately controlling the voltage at each core of a multicore processor without the expense of conventional multiple voltage regulators, and also provides a method of maximizing operating frequency of a multicore processor by voltage control at each core, this latter method usable with any voltage control technique. The first invention uses a set of binary switched parallel transistors to provide a programmable voltage drop before each core. The second invention uses independent core voltage control to reduce the voltage of faster cores, and then to increase the voltage of all cores together based on the reduced leakage currents provided by the first reduction.

Specifically, the present invention provides a multicore processor having at least two processing cores with of a plurality of transistors arranged in processing circuits each receiving a single operating voltage to supply power to the transistors and a clock input synchronizing processing speed of computations performed by the processing circuits. At least one clock input provides a clock signal to the clock inputs of the cores and at least one power control circuit is connected to each processing core and is controllable to independently control the operating voltage of the cores among a range of voltage values according to a power setting. The power settings of the power control circuits are set to different values for different cores providing different operating voltages to the cores to substantially balance a maximum speed of computation performed by the processing circuits to a common speed value and to substantially maximize the common speed value within a power dissipation constraint.

It is thus a feature of at least one embodiment of the invention to convert speed variations between individual cores into power savings that may be used to raise the operating speed of all the cores.

The power control circuits may be parallel-connected transistors switched between only two operating states of fully on and fully off according to data held in a control register.

It is thus a feature of at least one embodiment of the invention to provide a simple method of providing local control of core voltages without complex regulation circuitry.

The control register may provide control signals controlling transistor groups of at least one transistor forming the parallel-connected transistors, the transistor groups providing different effective conductive widths.

It is thus a feature of at least one embodiment of the invention to minimize the necessary width of the control register by permitting different bit weightings.

The different effective conductive widths of the transistor groups may follow an exponentially increasing relationship.

It is thus a feature of at least one embodiment of the invention to permit simple binary weightings and the like.

The control register may be a one-time programmable memory.

It is thus a feature of at least one embodiment of the invention to provide a simple method of performing a factory adjustment of a multicore processor after its manufacture.

The power control circuits may include one power control circuit for each processing core and one global power control circuit providing power to the power control circuits for each processing core.

It is thus a feature of at least one embodiment of the invention to minimize the effective control range required of each local power control circuit by delegating common power control requirements to a global power control circuit that may be placed opportunistically away from the cores. It is another object of the invention to provide for a simple two-step methodology of adjustment in which speed balancing is provided by the local power control circuits and speed maximization is provided by the global power control circuit.

The present invention also contemplates a method of manufacturing a multicore processor of the type described above including the steps of: (a) characterizing a relationship between supply voltage, maximum operating frequency, and power dissipation for each of the cores; and (b) setting the power control circuit for each core to different values to substantially balance a maximum speed of computation performed by the processing circuits of the different cores to a common speed value and to substantially maximize the common speed value within a power dissipation constraint using the characterization of step (a).

It is thus a feature of at least one embodiment of the invention to provide an improved manufacturing method for multicore processors that may increase yield or improve performance of manufactured multicore processors.

These particular features and advantages may apply to only some embodiments falling within the claims and thus do not define the scope of the invention.

BRIEF DESCRIPTION OF THE DRAWINGS

FIG. 1 is a simplified block diagram of one type of multicore processor showing a common clock line and shared thermal environment where each core has a separate power control circuit receiving power from a global power control circuit;

FIG. 2 is a schematic representation of a power control circuit suitable for use with the present invention employing multiple parallel transistor switches controlled by a control register;

FIG. 3 is a fragmentary detail of FIG. 2 showing the formation of a transistor switch out of two parallel transistors to provide one method of producing different switch weightings;

DETAILED DESCRIPTION OF THE PREFERRED EMBODIMENT

Figure 4:
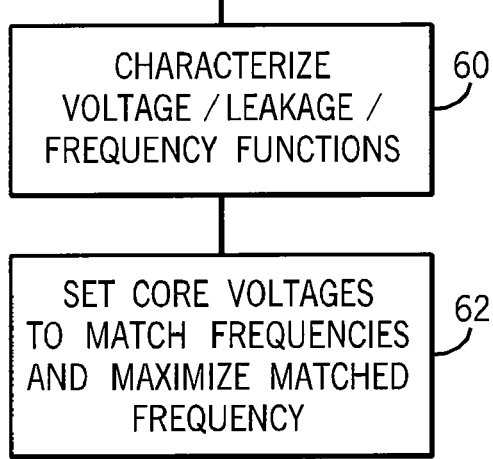
FIG. 4 is a flow chart of a first method of setting the switch register using modeling techniques.

Referring now to FIG. 1, a multicore processor 10 may include multiple processor cores 12a-12d. As is understood in the art, cores 12 provide for numerical processing of program instructions according to arithmetic and logical circuits implemented by transistors. These processor cores 12 may be formed on a single integrated circuit die or may be multiple dies attached on a substrate providing a common thermal environment 14 communicating with a heatsink 16 or the like. The common thermal environment means that the temperature of one core 12 affects the temperature of the other cores 12.

The cores 12 may include local cache memories 18 and a shared memory 20 which may be implemented through a single memory structure or by a message passing technique of a type known in the art. Each of the cores 12 may receive a clock signal 22 that synchronizes their internal operation and thus controls their speed of computations. Normally the clock signals will be identical for each core 12; however, the invention contemplates that the clock signals may differ in frequency as long as they are synchronized.

In the present invention, each core 12 may have an independent power control circuit 24 providing transistor switches 26 and programmable memories 28. Each of the independent power control circuits 24 controls the voltage ($VV_{DD}$) to its associated individual core 12 or optionally to a group of cores 12 as determined by a setting in the programmable memory 28.

The independent power control circuits 24 may receive an external source of power ($V_{DD}$) or, in a preferred embodiment, the output of a global power control circuit 30 ($V_{GLOBAL}$). In this case, the global power control circuit 30 receives the external source of power ($V_{DD}$). The global power control circuit 30 may also use one or more transistor switches 26 and a programmable memory 28 to control $V_{GLOBAL}$.

Referring now to FIG. 2, the independent power control circuits 24 and global power control circuit 30 may comprise a series of transistor switches 32 connected in parallel between $V_{DD}$ and $V_{GLOBAL}$ (for the global power control circuit 30) or between $V_{GLOBAL}$ and $VV_{DD}$ or $V_{DD}$ and $VV_{DD}$ (for the independent power control circuits 24). Each of the transistor switches 32 may have a gate connected via a buffer 34 to dual-input NAND gate 36 having one input shared among all NAND gates 36 and connected to a sleep signal that may be used to turn off all of the transistor switches 32 when the core 12 goes into sleep mode. A logically false value of the sleep signal turns off the cores 12. The other input of each NAND gate 36 connects to different bits 38 of a control register 40.

Control register 40 may be, for example, a one time programmable (OTP) memory providing bit values set by fuses or the like accessible using the bus structure and decoding of the multicore processor 10 according to techniques known in the art. It will be understood that the voltage drop across the switches 32 may be controlled by changing the number of switches 32 that are switched into a saturating mode and the number switches that are fully off, the particular one of these two states determined by bits of the control register 40. In this way, the voltage applied to each of the individual cores 12 may be separately controlled through the independent power control circuits 24 and the voltages to each of the cores 12 may be adjusted in common by the global power control circuit 30.

While each of the switches 32 may have an equal weighting with respect to determining the voltage drop across the switches, in a preferred embodiment, the effective conductive widths of the transistor switches 32 are varied, for example, in an exponential fashion (e.g. by powers of two) so that a larger number of different discrete voltage levels may be obtained. In this latter scheme, for example, eight switches 32 controlled by eight bits 38 can obtain 256 different voltage drop levels.

Referring now to FIG. 3, as noted above, this weighting may be provided by changing the conductive width of the transistors as they are fabricated or by placing multiple transistors 42 in parallel under the control of a single buffer 34 (and NAND gate 36 shown in FIG. 2) to provide transistor switch 32 having an arbitrary effective width.

In one embodiment, the global power control circuit 30 may use a conventional voltage regulator structure in which one or more transistors is operated in an active region between saturation and cut off to control $V_{GLOBAL}$, for example, using feedback of its output signal. The global power control circuit 30 may be placed away from cores 12 to provide improved heat dissipation qualities with respect to the thermal environment 14.

Referring now generally to FIG. 5, the present invention provides a setting of the registers 40 that improves the maximum operating frequency $F_O$ of the multicore processor 10. Referring to FIG. 5(a), at a given common operating voltage $VV_{DDc}$, different processing cores (three shown for clarity) may have different maximum operating frequencies being generally maximum clock frequencies that allow reliable computation. These different maximum operating frequencies are depicted as $F_{MAX1}$, $F_{MAX2}$, and $F_{MAX3}$. These different maximum operating frequencies are a result of variations in the manufacturing process of the circuits associated with each of the cores 12 and can be considered to be points on a set of curves 44 that described a voltage/leakage/frequency function specific to each core 12. The voltage/leakage/frequency will generally be a surface that defines the trade-off between operating voltage, transistor leakage (hence power dissipation) and maximum operating frequency.

Figure 5A:
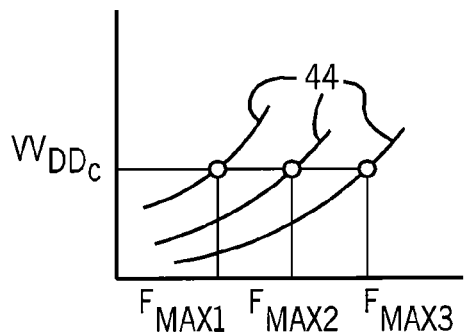
FIG. 5 is a set of charts showing the underlying functions behind the setting of the switches per FIG. 4.
Figure 5B:
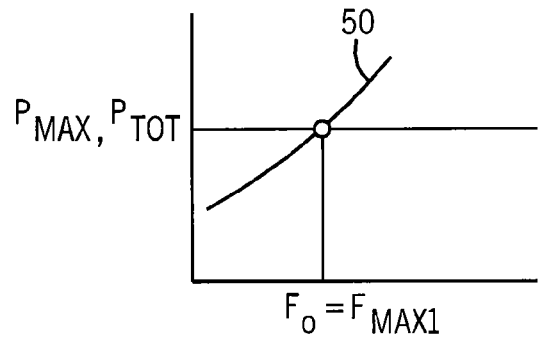

Referring to FIG. 5(b), when the cores are operated at an operating frequency $F_O$ dictated by and thus equal to the lowest maximum frequency of the cores, $F_{MAX1}$, the total power dissipation $P_{TOT}$ of the multicore processor 10 may be near or equal to a maximum design power dissipation $P_{MAX}$ for the multicore processor 10. The maximum design power dissipation is generally determined by peak temperatures within the integrated circuit as a function of achievable outward heat conduction through a heatsink 16. The power dissipation will generally lie on a curve 50 related to the operating frequency of the multicore processor 10 for a given operating voltage which may be derived from the three-dimensional surface of the voltage/leakage/frequency function.

Figure 5C:
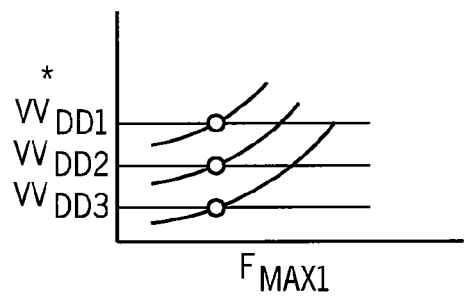

Referring now to FIG. 5(c), the operating voltages applied to each of the cores 12 may be changed, for example, as here depicted to $VV_{DD1}$, $VV_{DD2}$, and $VV_{DD3}$ to bring the maximum operating frequencies $F_{MAX1}$, $F_{MAX2}$, and $F_{MAX3}$ into alignment with the lowest maximum operating frequency for all of the cores: $F_{MAX1}$. This may be done by adjusting the settings of the control registers 40 associated with each independent power control circuit 24 for those cores 12 having maximum operating frequencies above $F_{MAX1}$. This generally reflects the relationship between leakage voltage and maximum operating frequency.

Figure 5D:
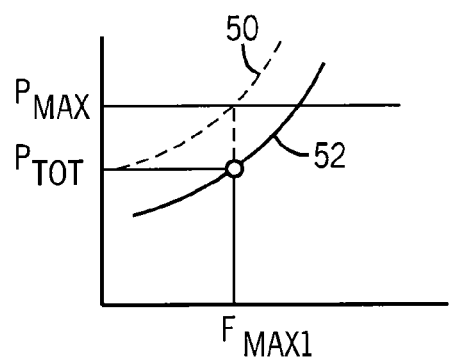

Referring to FIG. 5(d), the result of decreasing the operating voltages of cores 12 having higher operating frequencies is to lower the power dissipation curve 50 downward to power dissipation curve 52. The total power dissipation $P_{TOT}$ of the multicore processor 10 will thus now be below its maximum power dissipation $P_{MAX}$.

Figure 5E:
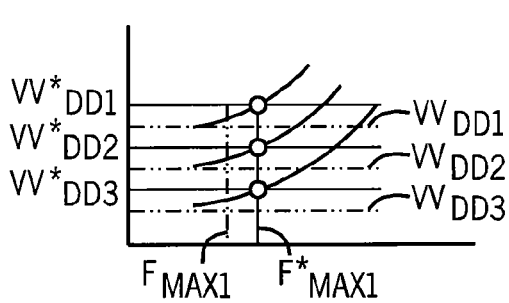
Figure 5F:
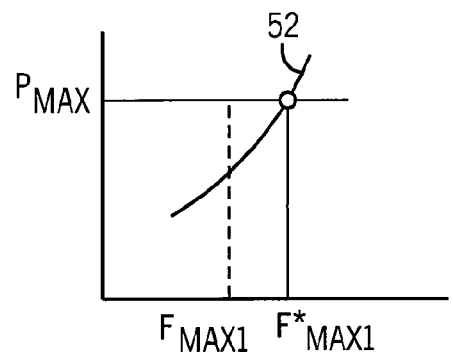

Referring now to FIG. 5(e), the operating voltages of each of the cores 12 may then be moved upward to take advantage of the additional power margin between $P_{TOT}$ and $P_{MAX}$ shown in FIG. 5(d). This may be done, for example, by adjusting the global power control circuit 30 or by offsetting adjustments in each of the independent power control circuits 24 as will be discussed in more detail below. The result is to move the operating voltages of $VV_{DD1}$, $VV_{DD2}$, and $VV_{DD3}$ shown in FIG. 5(c) to new higher operating voltages $VV^*_{DD1}$, $VV^*_{DD2}$, and $VV^*_{DD3}$ with a resulting increase in the operating frequency from $F_{MAX1}$ to $F^*_{MAX1}$. The amount of such movement will be dictated by the power dissipation curve 52 shown in FIG. 5(f) (derivable from the voltage/leakage/frequency function) so that the operating frequency $F_o$ becomes $F^*_{MAX1}$.

Referring now to FIG. 4, when the programmable memories 28 associated with each of the independent power control circuits 24 and global power control circuit 30 are one-time programmable memories, for example fuses, this process may be effected in two steps. The first step indicated by process block 60, characterizes the power voltage/leakage/frequency functions for each of the cores 12, for example, by checking their frequencies at a given nominal operating voltage (thus obtaining one data point on the curve 44) and generating the remainder of the curve 44 through the use of the modeling equation or empirically derived data.

At succeeding process block 62, the steps of FIG. 5 are implemented, for example iteratively, until a setting for the programmable memories 28 of the independent power control circuits 24 and global power control circuit 30 are determined. The programmable memories 28 may then be programmed.

Figure 6:
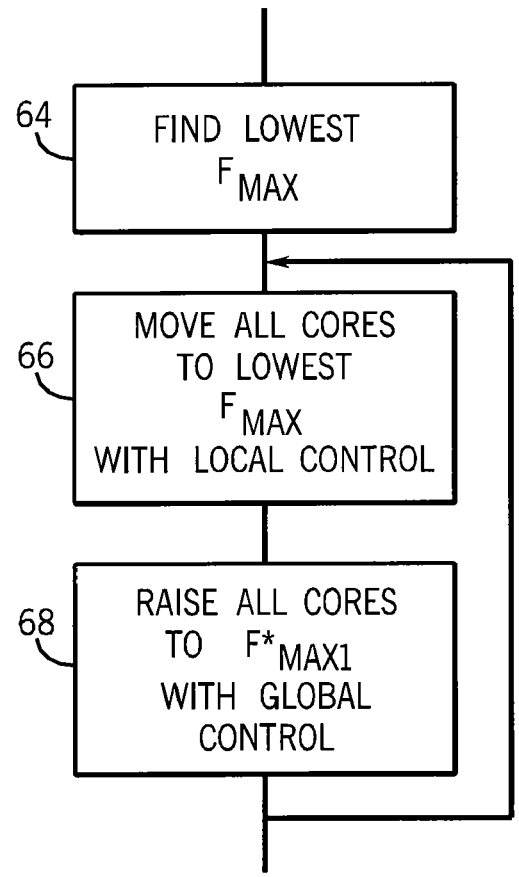
FIG. 6 is a flow chart of a second method of setting the switches without modeling.

Alternatively, as shown in FIG. 6, if the programmable memories 28 are not one-time programmable (OTP) or are operated in tandem with conventional multi-write registers, the modeling process of process block 62 may be eliminated and the necessary iteration implemented directly on the multicore processor 10 itself. In this situation, a first step determines the lowest maximum frequency $F_{MAX1}$ of the cores 12 at process block 64 (per the step of FIG. 5(a)). Next, the maximum operating frequencies of each of the cores 12 is moved into alignment with this lowest maximum frequency at process block 66 (per the step of FIG. 5(c)). This may be done by incrementally setting the programmable memories 28 of the independent power control circuits 24 until the necessary frequencies are reached. Finally, the voltage on all the cores 12 may be raised using the global power control circuit 30 per process block 68 as depicted by the step of FIG. 5(e). The process blocks of steps 66 and 68 may be repeated iteratively to obtain a desired precision. In this way the voltage/leakage/frequency function need not be known.

As noted above, it will be understood that this process may be implemented solely with independent power control circuits 24 and without the global power control circuit 30, where the independent power control circuits 24 provide through their setting both the individualized operating voltages for each core 12 and global adjustment of the core 12. While individual control of the operating voltage of each core 12 is preferred, in an alternative embodiment the cores 12 can be grouped in small sets for common control to reduce the number of necessary independent power control circuits 24. This grouping may be fixed or programmable.

The multiple cores 12 may include not only general purpose processing cores but specialized cores, for example, for graphics processing and the like. The programmable memories may, for example, be conventional memory structures or fuses or links that may be electrically, mechanically, or optically set or removed.

Generally a multicore processor as used herein includes processors where different processing cores share common clock timing and thus must be operated at the same clock frequency or with synchronized clock frequencies having different multiples. The invention is not limited to multicore processors and may be used with any integrated circuit where independent supply voltage adjustment of different circuit elements may be desired after fabrication.

It is specifically intended that the present invention not be limited to the embodiments and illustrations contained herein and the claims should be understood to include modified forms of those embodiments, including portions of the embodiments and combinations of elements of different embodiments as come within the scope of the following claims.

I claim:

1. A multicore processor comprising:
    at least two processing cores having a plurality of transistors arranged in processing circuits receiving an operating voltage to supply power to the transistors and a clock input synchronizing processing speed of computations performed by the processing circuits;
    at least one clock input providing a clock signal to the clock inputs of the cores; and
    at least one power control circuit for each processing core controllable to independently control the operating voltage of the cores among a range of voltage values according to a power setting; wherein the power settings of the power control circuits are set to different values for different cores providing different operating voltages to the cores to substantially balance a maximum speed of computation performed by the processing circuits to a common speed value and to substantially maximize the common speed value within a power dissipation constraint.

2. The multicore processor of claim 1 wherein the power control circuits are parallel-connected transistors switched between only two operating states of fully on and fully off according to data held in a control register.

3. The multicore processor of claim 2 wherein the control register provides control signals controlling transistor groups of at least one transistor forming the parallel-connected transistors, the transistor groups providing different effective conductive widths.

4. The multicore processor of claim 3 wherein the different effective conductive widths of the transistor groups follow an exponentially increasing relationship.

5. The multicore processor of claim 2 wherein the control register is a one-time programmable memory.

6. The multicore processor of claim 1 wherein the power control circuits include one power control circuit for each processing core and one global power control circuit providing power to the power control circuits for each processing core.

7. The multicore processor of claim 6 wherein the global power control circuit is a voltage regulator providing feedback voltage regulation of at least one transistor operated in a range between fully on and fully off states.

8. The multicore processor of claim 6 wherein the global power control circuit is parallel connected transistors switched between only two operating states of fully on and fully off according to data held in a control register.

9. The multicore processor of claim 1 wherein the cores are on a single integrated circuit.

10. A method of manufacturing a multicore processor having:
- at least two processing cores having a plurality of transistors arranged in processing circuits receiving an operating voltage supply power to the transistors and a clock input controlling processing speed of computations performed by the processing circuits;
- at least one clock signal providing a synchronized clock frequency to the clock inputs of the cores; and
- at least one power control circuit for each processing core controllable to independently control the operating voltage of the cores among a range of voltage values according to a power setting; the method comprising the steps of:
  - (a) characterizing a relationship between supply voltage, maximum operating frequency, and power dissipation for each of the cores; and
  - (b) setting the power control circuit for each core to different values to substantially balance a maximum speed of computation performed by the processing circuits of the different cores to a common speed value and to substantially maximize the common speed value within a power dissipation constraint using the characterization of step (a).

11. The method of claim 10 wherein step (b) identifies settings for the power control circuits substantially matching the maximum speed of each core to a lowest maximum speed of the cores and then increasing settings for the power control circuits to substantially maximize the matched maximum speed for the cores within a power constraint.

12. The method of claim 11 wherein the two steps are repeated iteratively.

13. The method of claim 12 wherein the power control circuits include one power control circuit for each processing core and one global power control circuit providing power to the power control circuits for each processing core and wherein the power control circuits for each processing core are set to match the maximum speed of each core to a lowest maximum speed of the cores and the global power control circuit is set to maximize the matched maximum speed for the cores within a power constraint.

14. The method of claim 10 step (b) of setting the power control circuits sets a control register controlling parallel-connected transistors of the power control circuit switched between only two operating states of fully on and fully off.

15. The method of claim 14 wherein the setting provides a binary value to the control register and the parallel-connected transistors provide switching units associated with each bit of a control register that follow an exponentially increasing relationship with respect to power transmission.

16. The method of claim 10 wherein the step of setting the control registers writes to a one-time programmable memory.

17. A digital integrated circuit comprising:
- at least two circuit elements having a plurality of transistors arranged in circuits receiving an operating voltage to supply power to the transistors and having an operating speed determined in part by the operating voltage;
- at least one power control circuit for each circuit element controllable to independently control the operating voltage of the circuit elements among a range of voltage values according to a power setting;
- wherein the power control circuits are parallel-connected transistors switched between only two operating states of fully on and fully off according to data held in a control register.

18. The digital integrated circuit of claim 17 wherein the control register provides control signals controlling transistor groups of at least one transistor forming the parallel-connected transistors, the transistor groups providing different effective conductive widths that follow an exponentially increasing relationship.

19. The digital integrated circuit of claim 17 wherein the power control circuits include one power control circuit for each circuit element and one global power control circuit providing power to the power control circuits for each circuit element wherein the global power control circuit is a voltage regulator providing feedback voltage regulation of at least one transistor operated in a range between fully on and fully off states.

* * * * *